(12) United States Patent
Oesterling et al.

(10) Patent No.: US 10,688,961 B2
(45) Date of Patent: Jun. 23, 2020

(54) IN-VEHICLE SMOKE DETECTION AND REPORTING SYSTEM AND METHOD FOR CAR SHARING AND RIDE SHARING VEHICLES

(71) Applicant: GM Global Technology Operations LLC, Detroit, MI (US)

(72) Inventors: Christopher L. Oesterling, Troy, MI (US); Orhan Bulan, Troy, MI (US); Dawn M. Chorbagian, Plymouth, MI (US); David H. Clifford, Royal Oak, MI (US); Robert Miles, Austin, TX (US); Paul H. Pebbles, Novi, MI (US); Hrushit B. Raval, Clinton Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 212 days.

(21) Appl. No.: 15/830,718

(22) Filed: Dec. 4, 2017

(65) Prior Publication Data

US 2019/0168711 A1 Jun. 6, 2019

(51) Int. Cl.
| | | |
|---|---|---|
| B60R 25/10 | (2013.01) | |
| G05D 1/02 | (2020.01) | |
| B60R 25/30 | (2013.01) | |
| B60Q 9/00 | (2006.01) | |
| B60R 25/31 | (2013.01) | |
| B60R 25/102 | (2013.01) | |
| G06F 16/51 | (2019.01) | |

(52) U.S. Cl.
CPC ........... *B60R 25/1004* (2013.01); *B60Q 9/00* (2013.01); *B60R 25/102* (2013.01); *B60R 25/305* (2013.01); *B60R 25/31* (2013.01); *G05D 1/021* (2013.01); *G06F 16/51* (2019.01); *B60R 2025/1013* (2013.01); *G05D 2201/0213* (2013.01)

(58) Field of Classification Search
CPC ... B60R 25/1004; B60R 25/102; G06F 16/51; B60Q 9/00
See application file for complete search history.

(56) References Cited

U.S. PATENT DOCUMENTS

| | | | |
|---|---|---|---|
| 7,386,377 B2 | 6/2008 | Sorensen | |
| 2009/0027188 A1* | 1/2009 | Saban | B60N 2/002 340/521 |

(Continued)

*Primary Examiner* — Michael D Lang

(57) ABSTRACT

A smoke detection system for an interior of a vehicle is provided. The smoke detection system includes a detection module and a reporting module. The detection module, while the vehicle is being used as part of a car sharing or ride sharing service: receives a sensor signal from a smoke detector; compares data included in the sensor signal to smoke characteristic or smoke pattern data; based on the comparison, determines whether an occupant of the vehicle is smoking; and generates an alert signal if the occupant is smoking. The reporting module at least one of: based on the alert signal, visually or audibly provides a warning to the occupant to stop smoking; transmits the alert signal to a mobile device of the occupant to indicate that a smoking event has been detected; or transmits the alert signal to a network device of a service provider to report the smoking event.

20 Claims, 8 Drawing Sheets

(56) References Cited

U.S. PATENT DOCUMENTS

2015/0343993 A1* 12/2015 Ferrieres ................. B60R 25/04
                                                          701/2
2016/0214553 A1*  7/2016 Benoit .................... H04W 4/90
2019/0096211 A1*  3/2019 Stadler ................. G08B 17/125

* cited by examiner

IN-VEHICLE SMOKE DETECTION AND REPORTING SYSTEM AND METHOD FOR CAR SHARING AND RIDE SHARING VEHICLES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to car sharing and ride sharing services and corresponding vehicles.

Mobility of people is ever changing. More and more people prefer to have reserved access to a vehicle rather than own a vehicle. A person may reserve a vehicle through car sharing services or ride sharing services. Car sharing refers to rental or lease of vehicles for typically short durations of time. A customer contacts a car sharing office to schedule pickup of a vehicle on a selected date and for use of the vehicle for a selected period of time. This may be done directly, via a network device and/or via a mobile device. The car sharing office reserves the vehicle for the selected date and period of time for the customer. The car sharing office provides location information informing the customer where to pick up the vehicle and access data to access the vehicle. The location information and access data are downloaded to the mobile device of the customer. This allows the customer to, on the selected date, arrive at the vehicle location and access the vehicle via the mobile device.

On the pickup date, the customer may start a car sharing application on the mobile device The mobile device may then communicate with a car sharing module located on the vehicle to permit unlocking and starting of the vehicle. The car sharing application can provide buttons to lock/unlock the doors of the vehicle, to start electronic operations on the vehicle, and/or to start an engine and/or electric motor on the vehicle. The mobile device may provide, for example, one or more passcodes, previously received from the car sharing office, to the car sharing module. The car sharing module verifies the passcodes and then allows the customer to access and operate the vehicle. A same vehicle may be reserved and shared by more than one customers for a same period of time, for example, when carpooling. A vehicle may be assigned to a first customer and shared with other customers, such that the first customer is permitted to operate the vehicle and the other customers are permitted to be passengers in the vehicle. As an alternative, a vehicle may be assigned to multiple customers, where each customer has permission to operate the vehicle.

Ride sharing refers to a vehicle transportation service that allows a customer of a service provider to schedule a location, date and time to have the customer picked up. On the selected date, a driver of the vehicle transportation service arrives with a vehicle at a pre-specified location and drives the customer to a selected destination.

SUMMARY

A smoke detection system for an interior of a vehicle is provided. The smoke detection system includes a memory, a detection module and a reporting module. The memory is configured to store at least one of smoke characteristic data and smoke pattern data. The detection module is configured to, while the vehicle is being used as part of a car sharing or ride sharing service: receive a sensor signal from a smoke detector; compare data included in the sensor signal to the at least one of the smoke characteristic data and the smoke pattern data; based on the comparison, determine whether an occupant of the vehicle is smoking; and generate an alert signal if the occupant is smoking, wherein the alert signal indicates that a smoking event has occurred. The reporting module is configured to at least one of (i) based on the alert signal, visually or audibly provide a warning to the occupant to stop smoking, (ii) transmit the alert signal to a mobile device of the occupant to indicate to the occupant that the smoking event has been detected, or (iii) transmit the alert signal to a network device of a service provider to report the smoking event, wherein the vehicle is reserved by the service provider for the occupant as part of the car sharing or ride sharing service.

In other features, the smoke detection system further includes the smoke detector, where: the smoke detector includes a camera; the camera is configured to view the interior of the vehicle and generate the sensor signal, wherein the data included in the sensor signal includes image data; and the detection module is configured to compare the image data to the at least one of the smoke characteristic data and the smoke pattern data, and based on the comparison between the image data and the at least one of the smoke characteristic data and the smoke pattern data, determine whether the occupant of the vehicle is smoking.

In other features, the detection module is configured to: via the camera, monitor air within the interior of the vehicle; detect at least one of an image pattern or an air movement pattern that matches a smoke pattern stored in the memory, where the at least one of the smoke characteristic data and the smoke pattern data includes the smoke pattern; and generate the alert signal based on the matching of the smoke pattern.

In other features, the detection module is configured to: via the camera, monitor movement of the occupant in the interior of the vehicle; detect a movement pattern of the occupant that matches a movement pattern stored in the memory, wherein the at least one of the smoke characteristic data and the smoke pattern data includes the movement pattern; and generate the alert signal based on the matching of the movement pattern. In other features, the detection module is configured to: via the camera, capture images of the occupant in the interior of the vehicle; compare at least one of portions or characteristics of the captured images to the at least one of the smoke characteristic data and the smoke pattern data; and generate the alert signal based on the comparisons between the at least one of portions or characteristics of the captured images and the at least one of the smoke characteristic data and the smoke pattern data.

In other features, the detection module is configured to: classify the portions of the captured images as being images with smoke or images without smoke; and verify classifications of the portions of the captured images based on sensor data from one or more sensors other than the camera. In other features, the detection module is configured to: via a camera, capture images within the interior of the vehicle; compare the captured images to images stored in the memory; based on the comparisons between the captured images and the images stored in the memory, detect a smoked object; and generate the alert signal based on the detection of the smoked object.

In other features, the smoke detection system further includes a vehicle control module configured to determine a position of a window of the vehicle. The detection module is configured to, based on the position of the window, determine whether the occupant is smoking. In other features, the smoke detection system further includes the smoke detector, where: the smoke detector includes a scent sensor; and the scent sensor is configured to generate the sensor signal.

In other features, the reporting module is configured to receive alert response data from the mobile device or the network device. The alert response data includes at least one of an indication to return the vehicle to the service provider or a fleet office, a fee for having the vehicle cleaned, a command for the vehicle to direct the occupant to return the vehicle to the service provider or the fleet office, or a command for the vehicle to autonomously return the vehicle to the service provider or the fleet office.

In other features, the reporting module is configured to transmit log data corresponding to the smoking event to at least one of the mobile device or the network device. In other features, the detection module is configured to, based on detection of the smoking event, instruct a vehicle control module to prevent or limit operations of the vehicle until smoking within the vehicle has stopped.

In other features, a network device is provided for a service provider providing car sharing or ride sharing services. The network device includes a control module, a transceiver and a memory. The control module is configured to schedule a reservation of a vehicle for a customer. The transceiver is configured to receive an alert signal and report from at least one of the vehicle or a mobile device of the customer. The alert signal indicates that a smoking event has occurred in the vehicle. The report includes data corresponding to the smoking event. The memory configured to store the alert signal and the report. The control module is configured to: remove the vehicle from service; initiate scheduling of cleaning of the vehicle; schedule an alternative vehicle for a future reservation for the vehicle; and generate alert response data. The alert response data includes at least one of (i) an indication to return the vehicle to the service provider or fleet office, (ii) a fee for having the vehicle cleaned, (iii) a command for the vehicle to direct the customer to return the vehicle to the service provider or a fleet office, or (iv) a command for the vehicle to autonomously return the vehicle to the service provider or the fleet office. The control module is further configured to transmit the alert response data to at least one of the vehicle or the mobile device.

In other features, the control module is configured to generate the alert response data to include the indication to return the vehicle to the service provider or fleet office. In other features, the control module is configured to generate the alert response data to include the fee for having the vehicle cleaned. In other features, the control module is configured to generate the alert response data to include the command for the vehicle to direct the customer to return the vehicle to the service provider or the fleet office or the command for the vehicle to autonomously return the vehicle to the service provider or the fleet office.

In other features, a mobile device is provided and includes a display, a first transceiver, a control module, and a second transceiver. The first transceiver is configured to receive a first alert signal from a sharing module of a vehicle while the vehicle is being used as part of a car sharing or ride sharing service. The first alert signal indicates that a smoking event has been detected within the vehicle. The control module is configured to, based on the first alert signal, generate a warning signal and display the warning signal on the display to warn at least one of an owner of the mobile device to have smoking in the vehicle stopped. The control module is configured to generate a second alert signal. The second alert signal indicates that the smoking event has been detected. The second transceiver is configured to transmit the second alert signal to a network device at a service provider office to report the smoking event, wherein the vehicle is reserved by the service provider for the owner of the mobile device as part of the car sharing or ride sharing service.

In other features, the control module is configured to generate a reservation or access request message. The second transceiver is configured to transmit the reservation or access request message to the sharing module, and based on the reservation or access request message, receive access information from the sharing module to unlock doors of the vehicle and start the vehicle.

In other features, the control module is configured to receive vehicle log data corresponding to the smoking event from the sharing module via the first transceiver and forward the vehicle log data to the network device via the second transceiver. In other features, the second transceiver is configured to receive, based on the second alert signal, receive alert response data from the network device. The control module is configured to at least one of display the alert response data or forward the alert response data via the first transceiver to the sharing module of the vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A service provider that provides car sharing and ride sharing services can experience considerable expenses when a customer smokes in a car sharing/ride sharing vehicle. There are expenses attributed to scheduling and having the interior of the vehicle cleaned and transportation of the vehicle to and from a cleaning and/or maintenance office. There is also lost revenue due to the vehicle being out-of-service for the period of time during which the vehicle is being cleaned. In addition, if the vehicle is accidentally placed in service without having the interior cleaned after a previous customer smoked in the vehicle, complaints are often received from subsequent customers stating that the interior of the vehicle smells like smoke. This can negatively affect repeat business.

Examples set forth herein include systems and methods for detecting and reporting "smoking events" within vehicles and performing operations to: prevent further smoking events; make customers associated with the smoking events accountable; schedule cleaning of the interiors of the vehicles; and scheduling alternative vehicles for customers scheduled to use the vehicles being taken temporarily out-of-service. A smoking event refers to a period of time during which a customer smokes within a vehicle being used under, for example, a car sharing or ride sharing agreement.

Figure 1:
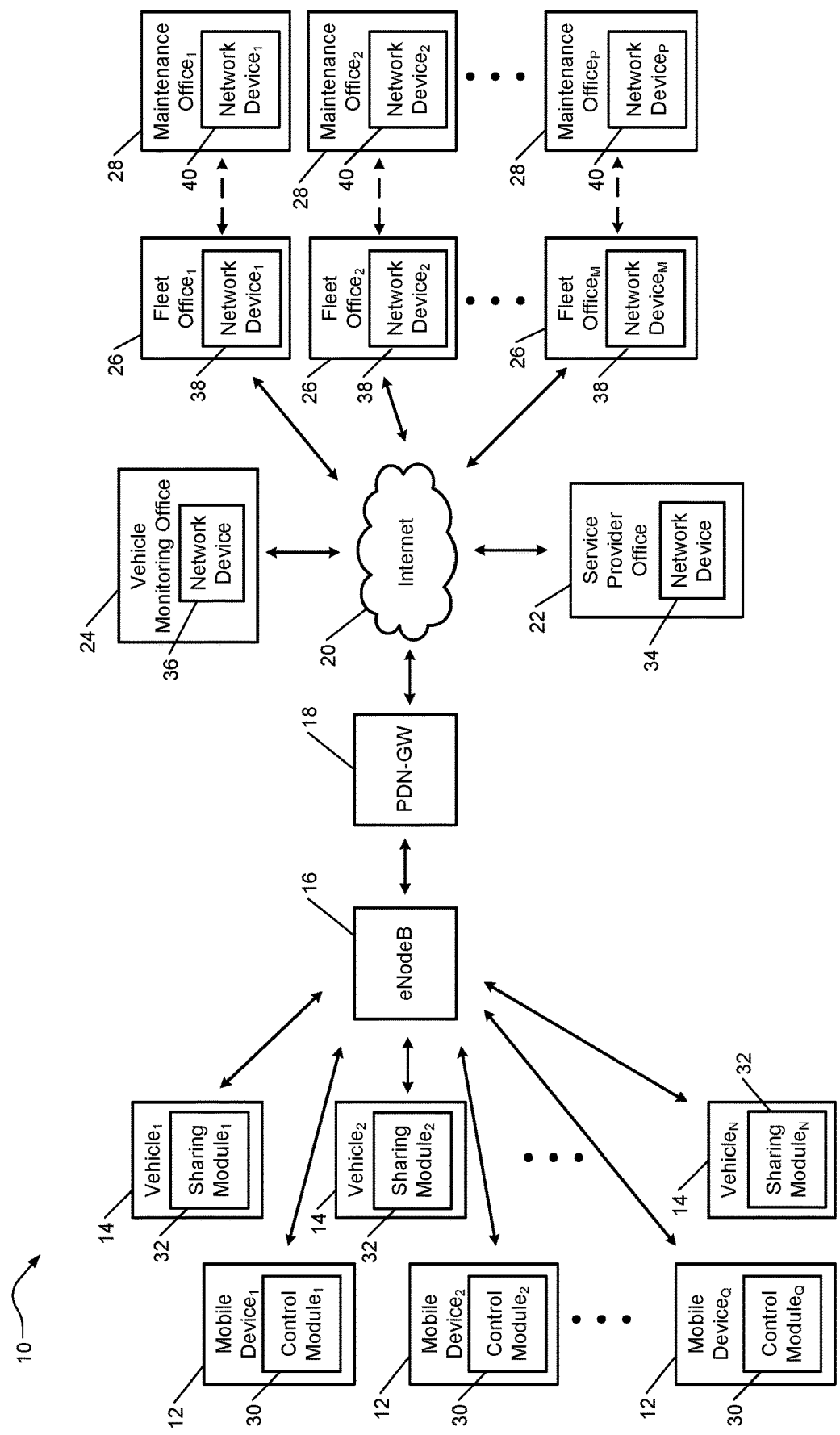
FIG. 1 is a functional block diagram of an example of a network including modules and network devices detecting, reporting and responding to smoking events in accordance with an embodiment of the present disclosure.

FIG. 1 shows a network 10 including mobile devices 12, vehicles 14, a base station (identified as evolved Node B (eNodeB) 16), a packet data network gateway (PDN-GW) 18, the Internet 20, a service provider office 22, a vehicle monitoring office 24, fleet offices 26, and maintenance offices 28. The mobile devices 12 include control modules 30. The vehicles 14 include sharing modules 32. The offices 22, 24, 26, 28 include corresponding network devices 34, 36, 38, 40. The sharing modules 32 may be referred to as accessory modules and detect and report smoking events to the control modules 30 of the mobile devices 12 and/or to the network devices 34, 38 of the offices 22, 26. The service provider office 22 may provide car sharing and/or ride sharing services. The service provider office 22 may be located separate from the fleet offices 26 or may be implemented as one of the fleet offices 26. The stated reporting may be done via the base station 16, the PDN-GW 18 and the Internet 20. The vehicles 14 may be located at the fleet offices 26 when not being used for customers and/or out of maintenance.

The network device 34 of the service provider office 22 may inform the network devices 38 of the fleet offices 26 associated with the vehicles for which a smoking event has occurred to schedule cleaning of the vehicles at the maintenance offices 28. The network device 34 may communicate with the network device 36 of the vehicle monitoring office 24 to determine locations of the vehicles and/or other vehicle related information. An example of the vehicle monitoring office 24 is an OnStar® office of the General Motors Company®. The network device 36 of the vehicle monitoring office 24 may provide subscription-based communications, in-vehicle security, hands-free calling, turn-by-turn navigation, and remote diagnostics for the vehicles 14.

The sharing modules 32 of the vehicles 14 and/or the network device 34 of the service provider office 22 can send warnings/alerts to the control modules 30 of the mobile devices 12 and/or onboard displays of the vehicles 14 to instruct vehicle occupant(s) to stop smoking. These warnings/alerts may also include fees being applied to bills/accounts of the customers of the vehicles 14 due to the smoking behavior. The customers may own the mobile devices 12. This may include cleaning fees, vehicle delivery and pickup fees for the cleaning services, loss of revenue due to the vehicle being out-of-service for cleaning purposes, and/or other associated fees.

Figure 2:
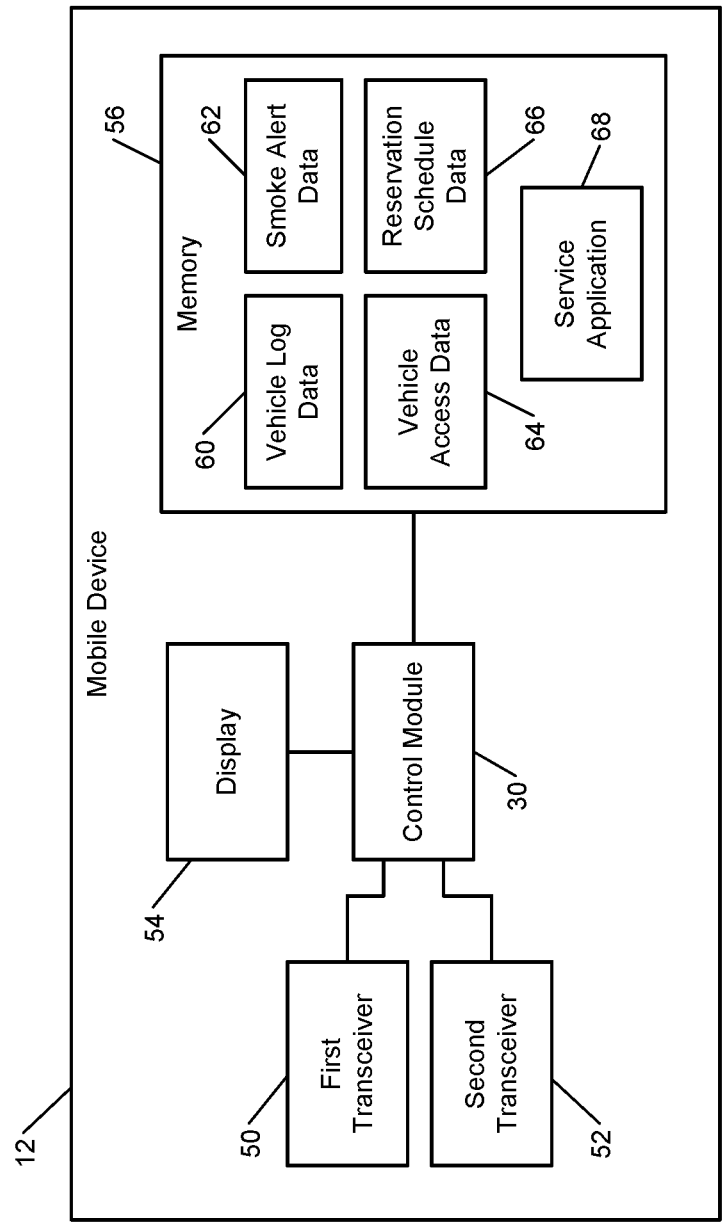
FIG. 2 is a functional block diagram of an example of a mobile device including a control module operating in accordance with an embodiment of the present disclosure.

FIG. 2 shows an example of the mobile devices 12 of FIG. 1. The mobile device 12 includes the control module 30, a first transceiver 50, a second transceiver 52, a display 54 and a memory 56. The mobile device 12 may be a mobile phone, a tablet, a computer (e.g., laptop computer), a wearable device, etc. The first transceiver 50 may be a short range or wireless local area network (WLAN) transceiver (e.g., a Bluetooth® low energy transceiver or a wireless fidelity (Wi-Fi®) transceiver) that satisfies, for example, the Institute of Electrical and Electronics Engineers (IEEE) 802.15.1 standard or the IEEE 802.11x standard and/or other type of transceiver configured to wirelessly communicate with a sharing module of a vehicle. The second transceiver 52 may be a cellular or broadband network transceiver, a wide area network (WAN) transceiver, a transceiver that satisfies, for example, the long-term evolution (LTE) standard and/or the IEEE 802.11, IEEE 802.15, and/or IEEE 802.16 standards, and/or other type of transceiver configured to wirelessly communicate with the service provider office 22 via the Internet 20 as shown in FIG. 1. The display 54 may be a touchscreen that is used as a user interface to receive inputs from a user.

The control module 30 may store vehicle log data 60, smoke alert data 62, vehicle access data 64, reservation schedule data 66, and/or other data in the memory 56. The vehicle log data may include: timestamps including dates and times of use of vehicles; timestamps and durations of smoking events; smoke detector data; vehicle location data; customer/user/driver/passenger (hereinafter referred to as a vehicle occupant) identifiers (e.g., names, driver license numbers, credit card numbers, social security numbers, phone numbers, etc.); reservation numbers; passcodes to access vehicles; location(s) of smoker(s) in vehicle; a vehicle identifier (e.g., a vehicle identification number (VIN) and/or a license plate number); etc. The smoke alert data may include data indicating smoking events that have occurred, timestamps, warnings to vehicle occupant(s) that are smoking and/or customer responsible for vehicle, and alerts to the service provider office (also referred to as a back office). This may include warning a driver when a passenger is smoking. The driver (or customer) for which the vehicle is assigned to may be held accountable for a smoking event committed by the driver (or customer) and/or a smoking event committed by a passenger. In one embodiment, the smoke alert data includes the vehicle log data. The vehicle access data may include the passcodes, the vehicle occupant identifiers, a mobile device identifier, the vehicle identifier. The reservation schedule data may include dates and durations of reservations, vehicle identifiers, vehicle occupant identifiers, etc.

The control module 30 may execute and/or be instructed by a user to execute a service application 68. The service application 68 may be executed to reserve a vehicle, receive access information (e.g., the vehicle access data 64), receive and provide smoking event alert messages, receive and forward the vehicle log data 60, and/or to perform other operations described herein.

Figure 3:
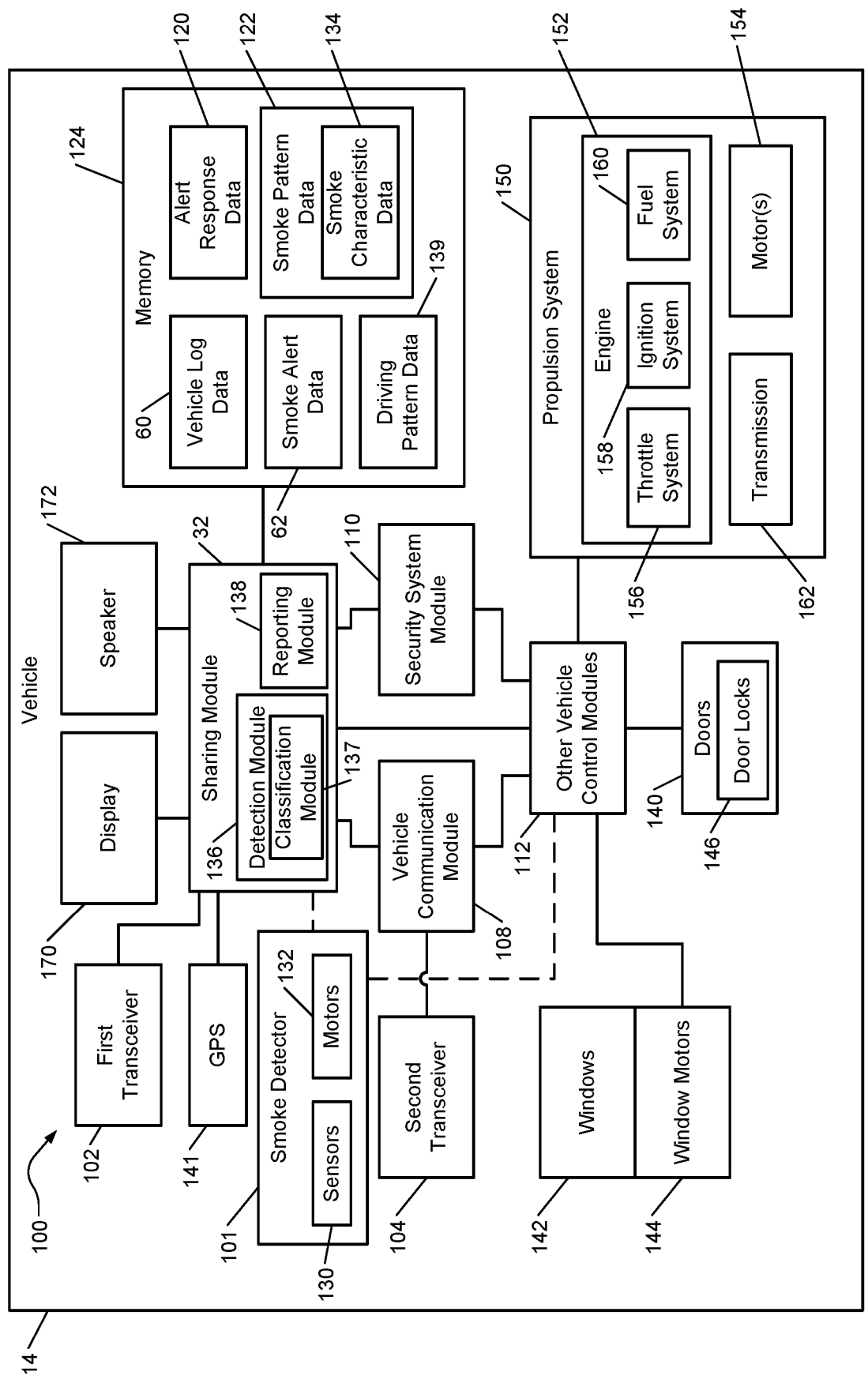
FIG. 3 is a functional block diagram of an example of a vehicle including a sharing module operating in accordance with an embodiment of the present disclosure.

FIG. 3 shows an example of the vehicle 14 of FIG. 1. The vehicle 14 includes a smoke detection system 100 that includes the sharing module 32, one or more smoke detectors (a single smoke detector 101 is shown), transceivers 102, 104, a display 106, a vehicle communication (or telematics) module 108, a security system module 110, and other vehicle control modules 112. The sharing module 32 detects smoking events via the smoke detectors and generates alert signals indicating the vehicle log data 60, the smoke alert data 62, alert response data 120, smoke pattern data 122, and/or other data, which may be stored in a memory 124. Examples of the vehicle log data 60 and the smoke alert data 62 are described above.

The alert response data 120 may be received from the network device 34 of the service provider office 22 and includes: warnings to the vehicle occupant that is smoking in the vehicle, other vehicle occupants and/or customer responsible for the vehicle; additional fees due to the detected smoking; indicators that the vehicle needs to be returned; warnings that the vehicle is being directed and/or autonomously driven back to a fleet office; warnings that the vehicle occupant responsible for the vehicle is no longer permitted to rent and/or lease a vehicle from the service provider; and/or other information pertaining to a detected smoking event.

The smoke detector 101 may include sensors 130, such as a gas detector, one or more cameras, one or more infrared sensors, and/or other sensors used to detect that a vehicle occupant is smoking. The sensors 130 may be located anywhere in the vehicle 14. The smoke detector 101, unlike smoke detectors used in residential homes, detects whether a person is smoking.

The smoke detector 101 may also include one or more motors 132 for moving and/or directing the sensors 130. In one embodiment, one or more cameras are used to monitor an interior of the vehicle 14 and generate sensor data, which is stored in the memory 124 as part of the vehicle log data 60. The sharing module 32 may compare the sensor data received from the cameras to the smoke pattern data 122, which may include smoke characteristic data 134. The smoke characteristic data 134 may include pixel colors, pixel brightness levels, pixel contrast ratios, variations between pixels, etc. The smoke pattern data 122 may include the smoke characteristic data 134 and historical data and/or patterns, such as patterns in the smoke characteristic data 134, facial patterns, facial movement patterns, occupant movement patterns typical for a smoker (e.g., hand and/or arm gestures and/or movement patterns), patterns of smoking objects (e.g., cigarettes, cigars, pipes, electronic cigarettes, joints, spliffs, blunts, etc.), smoke/puff patterns, thermal image patterns, and/or changes in pixel characteristic patterns. The patterns of smoking objects may include smoking object images, outlines, corresponding typical movements while being smoked, changes in color, etc. The smoke characteristic and/or smoke pattern data may also include a parameter associated with when a window position is in a certain operating range. For example, a smoker often has a window "cracked" or slightly open to allow smoke to leave the interior of the vehicle. The smoke pattern data may include air patterns within the vehicle corresponding to movement of smoke. The sensor data may include images and/or video of vehicle occupants, smoked objects, and air/smoke in the vehicle.

The sensors 130 and/or cameras may be used to monitor regions-of-interest, such as a region including a lower portion of a face of a vehicle occupant, such as the nose, mouth and jaw of the vehicle occupant. Facial movement patterns may be monitored. Also, air patterns near the face of the vehicle occupant may be monitored.

The sharing module 32 may include a detection module 136 with a classification module 137 and a reporting module 138. Although the detection module 136 and the classification module 137 are shown as being part of the sharing module 32, the modules 136, 137 may be located in the smoke detector 101 and/or the smoke detector 101 may also include modules similar to the modules 136, 137. The detection module 136 may control positioning of the sensors 130 via the motors 132 and compare data received from the sensors 130 to the smoke pattern data 122 and detect smoking events based on the comparisons. The classification module 137 may perform pattern recognition and machine visioning to detect and/or classify the stated patterns.

As an example, the detection module 136 may compare a selected set of pixel data to a stored set of pixel data and if a sum of differences between pixels in the selected set of pixel data and pixels in the stored set of pixel data is within a predetermined range, then a match is found. As another example, changes in a selected set of pixels of images captured by the smoke detector 101 may be compared to changes associated with a set of pixels stored in the memory 124. If the selected set of pixels changes are similar to (e.g., within predetermined ranges of) changes of the stored set, then a match is found. If a match is found, then a vehicle occupant is determined to have smoked in the vehicle 14.

In another embodiment, the sensors 130 include a scent sensor (or electronic nose) that is used to detect odors within the vehicle. The sensors 130 may include a sensor array, metal-oxide-semiconductor (MOSFET) devices, conducting polymers, polymer composites, a quartz crystal microbalance (QCM) sensor, a surface acoustic wave sensor or other microelectromechanical system (MEMs) device, a polymer coated QCM sensor, a mass spectrometry device, or ultrafast gas chromatography device, and/or other types of scent sensors and/or components and materials.

The classification module 137 may perform pattern recognition of odors associated with smoking based on the data collected from the scent sensor. Odor pattern data may be stored in the memory 124 and compared to data collected by the scent sensor. If there is a match in the pattern, a vehicle occupant has and/or is determined to be smoking in the vehicle. Threshold levels may be checked to prevent false alarms. For example, if the interior of the vehicle smells like smoke, however the current occupant is not smoking, then the odor is due to a smoking behavior of a previous occupant. In addition or as an alternative to checking threshold levels, other collected data, such as image data may be analyzed to confirm when the vehicle occupant is smoking.

In another embodiment, the sensors 130 include vehicle operation sensors, which are used to monitor driving patterns of a driver of the vehicle. Driving pattern data 139 is stored in the memory 124. For example, acceleration, braking, and steering patterns may be monitored via an accelerometer, an accelerator position sensor, a brake pedal position sensor, a steering position sensor, etc. In one embodiment, driving pattern data is obtained from a global positioning system 141. As an example, a driver that is smoking may be distracted due to smoking and swerve or steer the vehicle differently, brake differently, and/or accelerate differently than a typical driver that is not smoking. This pattern may be detected by the detection module 136 and as a result the detection module 136 determines that a smoking event has occurred.

The detection module 136 may record timestamps of smoking events including smoking start times, duration and/or end times. This data may be included in the vehicle log data 60. In addition to the data collected from the sensors 130, the vehicle log data 60 may include any patterns detected, results of pattern recognition, positions of the sensors 130, location of smoker in vehicle, images of smoker, identifiers of smoker and/or mobile device of smoker, and/or other smoke event related information.

The transceivers 102 may include may be a short range or WLAN transceiver (e.g., a Bluetooth® low energy transceiver or a Wi-Fi® transceiver) that satisfies, for example, the IEEE 802.15.1 standard or the IEEE 802.11x standard and/or other type of transceiver configured to wirelessly communicate with mobile devices within the vehicle. The transceiver 104 may be a cellular or broadband network transceiver, a WAN transceiver, a transceiver that satisfies, for example, the LTE standard and/or the IEEE 802.11, IEEE 802.15, and/or IEEE 802.16 standards, and/or other type of transceiver configured to wirelessly communicate with the network devices 34, 36 of FIG. 1. In one embodiment, the first transceiver 102 is a short range transceiver and the second transceiver 104 is a WLAN transceiver. Although the second transceiver 104 is shown as being connected to the vehicle communication module 108, the second transceiver 104 may be connected to and/or shared with the sharing module 32 and/or included as part of the vehicle communication module 108. In one embodiment, another WLAN transceiver is connected to the sharing module 32.

The vehicle communication module 108 communicates with the network device 36 at the vehicle monitoring office 24 of FIG. 1. As an example, the vehicle communication module 108 may be an OnStar module mounted in a rear-view mirror of the vehicle 14. The rear-view mirror may have buttons for activation and operation of the vehicle communication module and a microphone to receive verbal messages from vehicle occupants. The sharing module 32 may communicate with the vehicle communication module 108 to obtain vehicle information. The vehicle information may be reported, as a result of a smoking event, to a control module of a mobile device and/or the network device 34 of the service provider office 22 of FIG. 1. In one embodiment, the smoke detector 101 and/or the detection module 136 detects a smoking event and signals the communication module 108, which reports the smoking event to the control module 30, the network device 34 and/or the network device 36 of FIG. 1. The smoke detector 101 may detect and generate alerts and be connected to, for example, an in-vehicle hotspot (e.g., an OnStar® in-vehicle hotspot) provided by the communication module 108, which may operate according to Wi-Fi protocols and/or transmit and receive Wi-Fi® signals. The smoke detector 101 may wirelessly communicate with the communication module 108. The detection and reporting may be implemented by detection and reporting modules of the smoke detector 101.

As another example, the smoke detector 101 may detect smoke events and generate alerts and transmit the alerts to the sharing module 32 via Bluetooth Low Energy (BLE) signals. The detection and reporting may be implemented by detection and reporting modules of the smoke detector 101. The BLE signals may be transmitted directly from the smoke detector 101 to the sharing module 32. The sharing module 32 then transmits alert signals to a user's mobile device (e.g., one of the control modules 30). This may also be accomplished by transmitting BLE signals between the sharing module 32 and the user's mobile device via, for example the first transceiver 102.

A yet another example, the smoke detector 101 may detect smoke events and generate alerts and transmit the alerts to the sharing module 32 via Bluetooth Low Energy (BLE) signals. The detection and reporting may be implemented by detection and reporting modules of the smoke detector 101. The BLE signals may be transmitted directly from the smoke detector 101 to the sharing module 32. The sharing module 32 may then directly transmit alert signals to the network device 34 and/or the network device 36 of FIG. 1. Although not shown, the sharing module 32 may be cellular connectivity enabled and include the transceiver 104 and/or other transceiver and communicate directly with the network device 34 and/or the network device 36 of FIG. 1. In one embodiment, the sharing module 32 includes a global positioning system (GPS), such as the GPS 141, and facilitates a remote vehicle disable operation, for example, when a smoking event occurs. One of the network devices 34, 36 may signal the sharing module 32 based on an alert signal received from the sharing module 32 to limit and/or disable certain vehicle operations, as disclosed herein.

The security system module 110 may control and/or enable the locking and unlocking of doors 140, the opening and/or closing of windows 142 via window motors 144, the turning on and/or starting of the vehicle 14, and/or the setting off of a vehicle alarm and/or reporting of a vehicle break-in event. This may include controlling and/or enabling unlocking and locking of door locks 146 of the doors 140. The turning on and/or starting of the vehicle 14 may include the powering on of electronic components and/or the starting of a propulsion system 150. The starting of the propulsion system 150 may include the starting of an engine 152 and/or one or more electric motors 154. This may include enabling operation of a throttle system 156, an ignition system 158, a fuel system 160 and/or a transmission 162.

The other vehicle control modules 112 may include, for example, an engine control module, a transmission control module, an electric motor (or hybrid) control module, and/or other modules that control operation of vehicle components and/or devices.

The smoke detection system 100 further includes one or more displays and speakers; a single display 170 and a single speaker 172 are shown. Each of the displays may be, for example: in-dash display; a heads up display; a display mounted in a headliner, a headrest, or a seatback; or other vehicular display. The displays and speakers are used to provide warnings and/or other alert messages to vehicle occupants.

Figure 4:
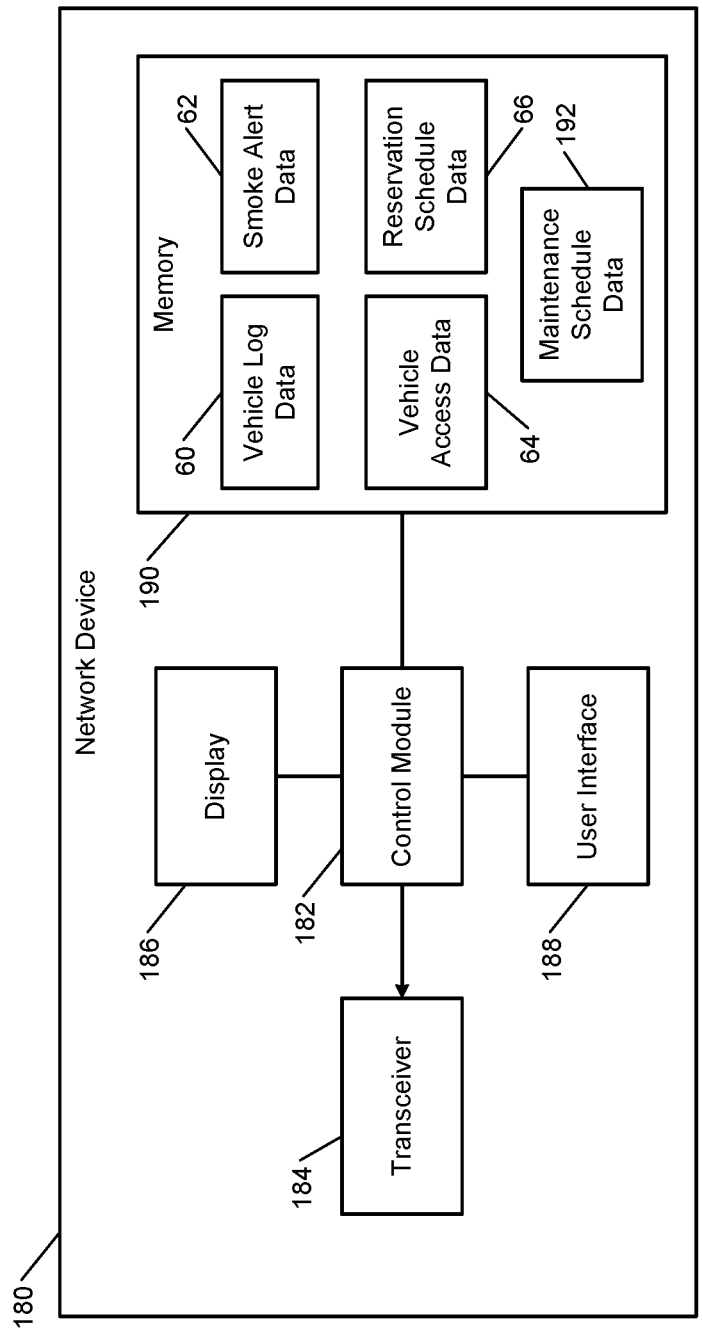
FIG. 4 is a functional block diagram of an example of a network device including a control module operating in accordance with an embodiment of the present disclosure.

FIG. 4 shows a network device 180, which may be a computer, a terminal, a work station, a tablet, and/or other network device. The network devices 34, 36, 38 and 40 of FIG. 1 may be configured as the network device 180. The network device 180 may include a control module 182, a transceiver 184, a display 186, a user interface 188, and a memory 190. The control module 182 may communicate with the control modules 30 of the mobile devices 12 and the sharing modules 32 of the vehicles 14 via the transceiver 184. The transceiver 184 may be a cellular or broadband network transceiver, a WAN transceiver, a transceiver that satisfies, for example, the LTE standard and/or the IEEE 802.11, IEEE 802.15, and/or IEEE 802.16 standards, and/or other type of transceiver similar to the transceivers 52, 104 of FIGS. 2-3. The control module 182 may store and/or have access to the vehicle log data 60, the smoke alert data 62, the vehicle access data 64, the reservation schedule data 66, and maintenance schedule data 192. The maintenance schedule data may include service schedule dates and times including cleaning schedule dates and times for the vehicles 14 of FIG. 1. The maintenance schedule data may include the services and/or types of cleaning being performed and the costs of the services and/or types of cleaning being performed.

Figure 5:
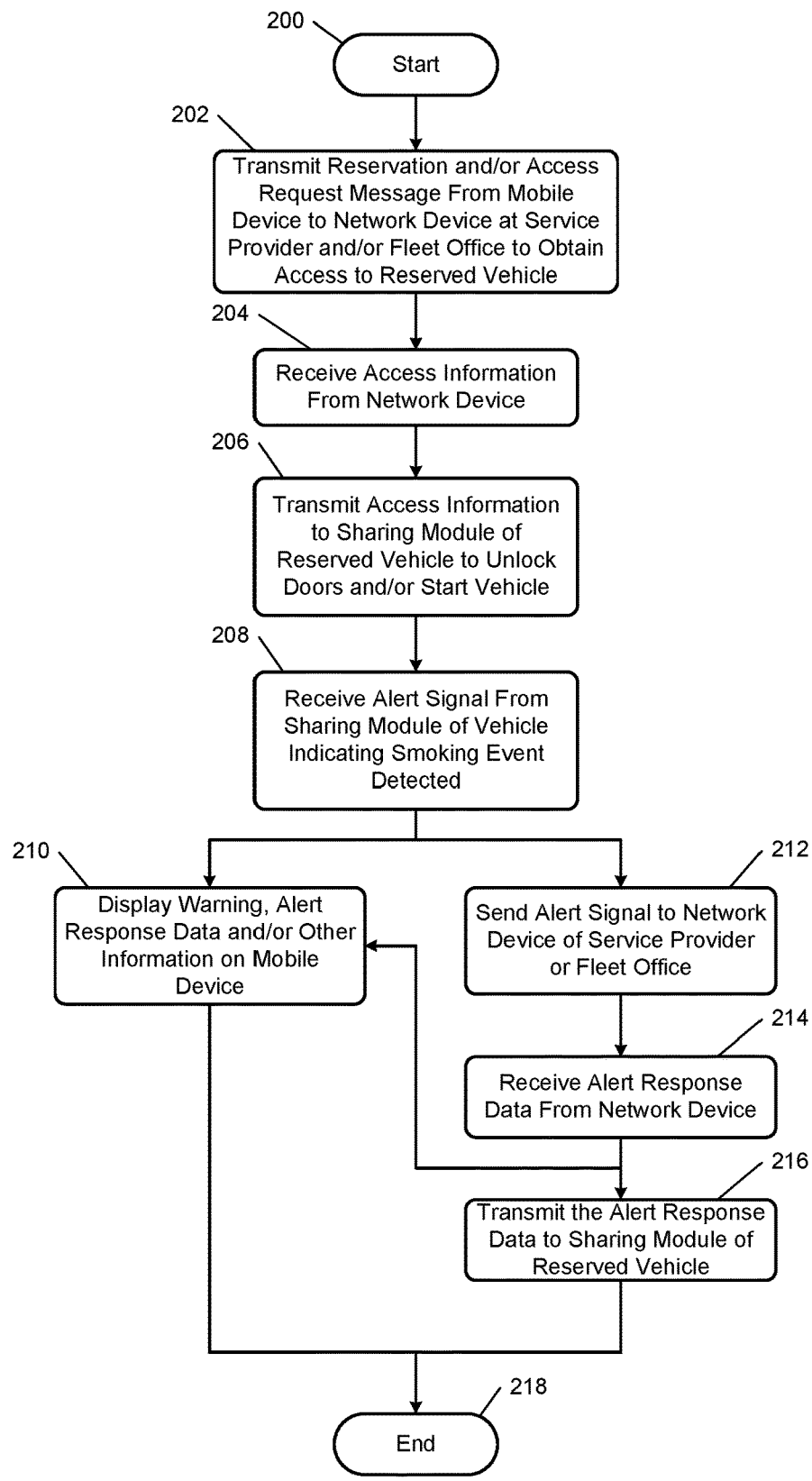
FIG. 5 illustrates an example method of operating a mobile device in accordance with an embodiment of the present disclosure.

The systems disclosed herein may be operated using numerous methods, example methods are illustrated in FIGS. 5-8. In FIG. 5, a method of operating a mobile device is shown. Although the following methods are shown as separate methods, one or more of the methods and/or operations from separate methods may be combined and performed as a single method. For example, the method of FIG. 8 may be performed as part of the method of FIG. 6.

Figure 6:
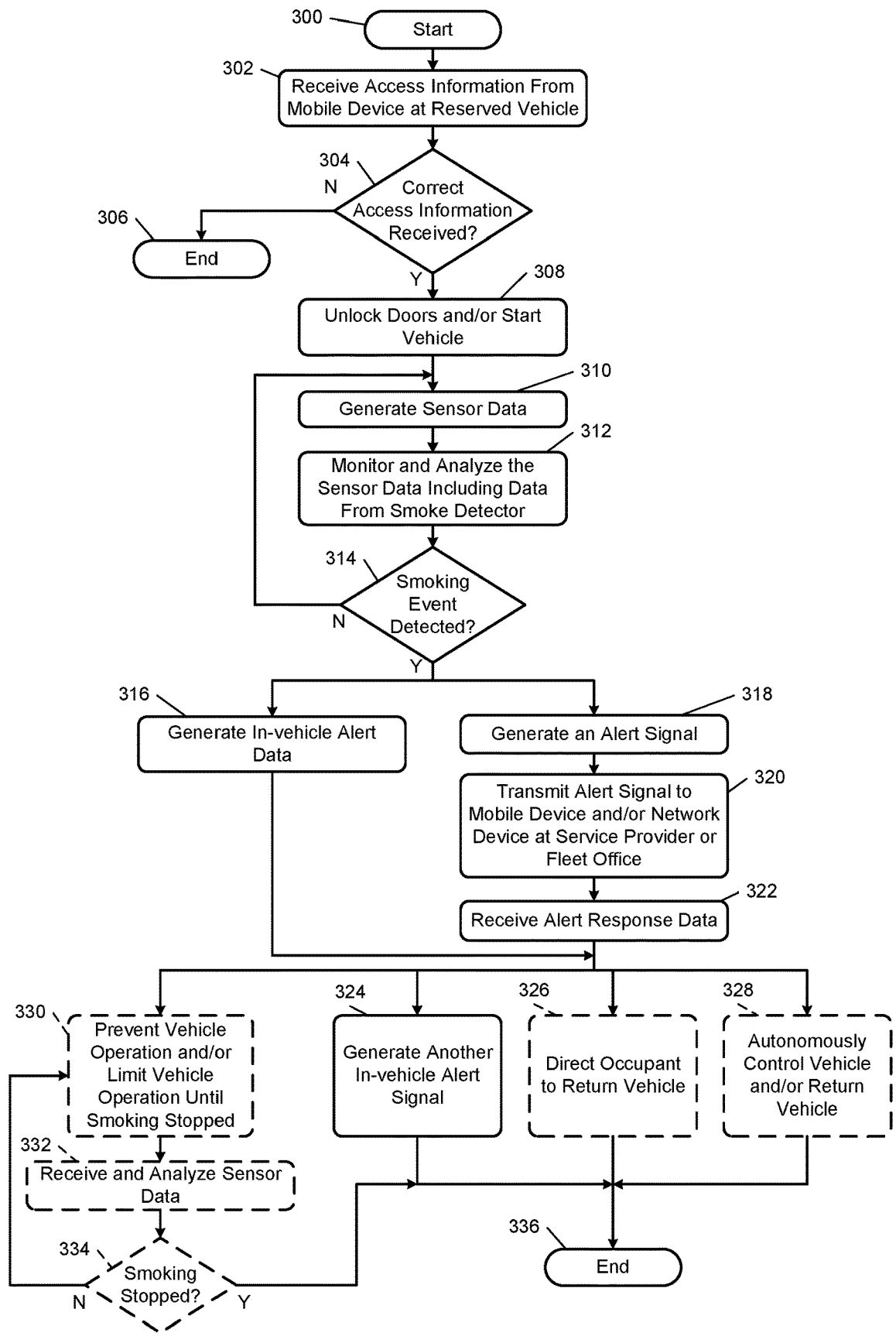
FIG. 6 illustrates an example method of operating a sharing module of a vehicle in accordance with an embodiment of the present disclosure.
Figure 7:
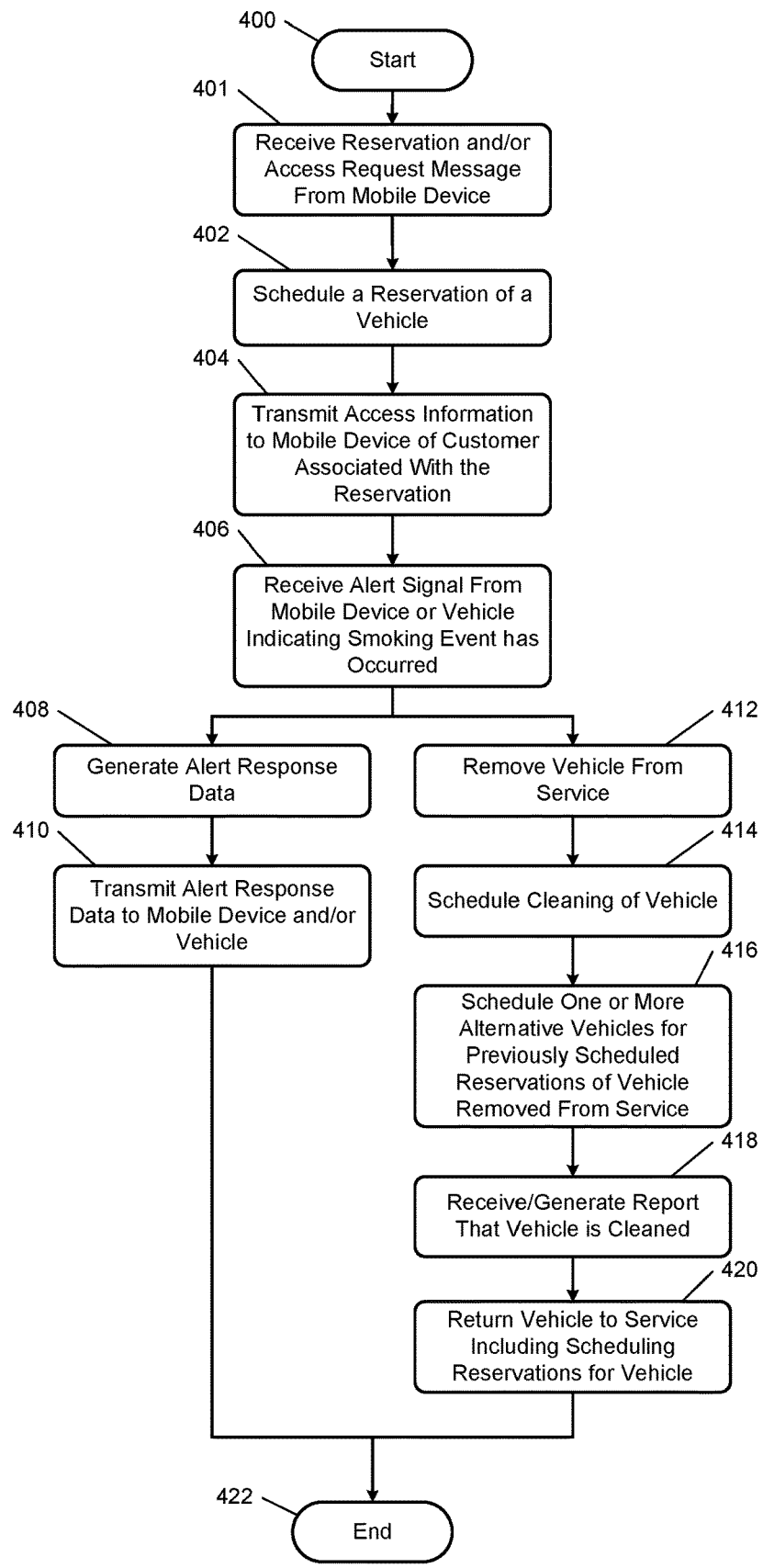
FIG. 7 illustrates an example method of operating a network device of a service provider office in accordance with an embodiment of the present disclosure.

Also, each of the methods of FIGS. 5-7 may be performed while the other ones of the methods of FIGS. 5-7 are performed. Also, although the following operations of FIGS. 5-8 are primarily described with respect to the implementations of FIGS. 1-4, the operations may be easily modified to apply to other implementations of the present disclosure. The operations of FIGS. 5-8 may be iteratively performed.

The method of FIG. 5 may begin at 200. At 202, one of the control modules 30 of the mobile devices 12 may transmit a reservation and/or access request message to the control module 182 of the network device 34 of the service provider office 22. The reservation and/or access request message may be sent to one of the network devices 38 of the fleet offices 26, for example, when the service provider office is implemented also as a fleet office. The reservation and/or access request message may request a reservation for a vehicle held at one of the fleet offices 26 and/or access information for accessing the vehicle.

At 204, the control module 30 receives access information from the control module 182. The access information as described above may include passcodes to unlock and enable starting of the vehicle.

At 206, the control module 30 transmits the access information to a sharing module 32 of the vehicle to have the doors of the vehicle unlocked and to at least one of enable starting of the vehicle or start the vehicle. In one embodiment, the sharing module 32 receives the passcodes, verifies that the passcodes are correct, and then permits the vehicle to start when the customer presses a start/stop button in the vehicle. If the passcodes are incorrect, the sharing module 32 may not unlock the doors and/or prevent starting of the vehicle.

At 208, the control module 30 may receive an alert signal as described above from the sharing module 32 when the sharing module has detected that a smoking event has occurred in the vehicle. At 210, the control module 30 may, based on the alert signal, display a warning, the alert response data 120, and/or other information on a display of the mobile device 12. Operation 210 may be performed subsequent to operation 214.

At 212, the control module 30 sends the alert signal or another alert signal to the control module 182 to report the smoking event to the network device 34 to have the vehicle cleaned and to prevent future smoking events in the vehicle. The control module 30 may generate a second alert signal, which may include the information in the first alert signal and/or indicate whether the vehicle occupant has been warned via the mobile device 12 to have the smoking stopped. At 214, the control module 30 may receive the alert response data 120 from the control module 182. Operation 214 may be performed while operation 210 is performed. At 216, the control module 30 may transmit the alert response data 120 to the sharing module 32 of the vehicle. The method may end at 218.

FIG. 6 shows a method of operating the sharing module 32 of a vehicle, which may be the vehicle referred to above in the description for the method of FIG. 5. The method may begin at 300. At 302, the sharing module 32 receives the access information to access the vehicle.

At 304, the sharing module 32 determines whether the access information received is correct. If correct, operation 308 is performed, otherwise the method may end at 306. At 308, the sharing module 32 may instruct one of the vehicle control modules 112 to unlock the door locks 146 of the doors 140. The sharing module 32 may also instruct one of the vehicle control modules 112 to permit and/or start the vehicle. The sharing module 32 may also instruct the security system module to disable a vehicle alarm system.

At 310, the sensors 130 and/or other sensors in the vehicle may generate sensor data, which may be monitored by the sharing module 32, the vehicle communication module 108 and the vehicle control modules 112. The other sensors may include vehicle speed, accelerator, brake pedal, steering, engine speed, and/or other vehicle sensors. The sensor data includes sensor data from the smoke detector 101.

At 312, the detection module 136 monitors and analyzes the sensor data from the smoke detector and/or the other sensor data. At 314, the detection module 136, based on the results of the analyzing of the sensor data, determines whether a smoking event has occurred. The method of FIG. 8 may be performed as part of or as an alternative to operations 312 and 314.

At 316, based on detection of the smoking event, the reporting module 138 generates in-vehicle alert data. Operation 316 may be performed while operations 318, 320, and 322 are performed.

At 318, the reporting module 138 may generate an alert signal based on the detected smoking event. The alert signal may include the vehicle log data 60. At 320, the reporting module 138 may transmit the alert signal to the control module 30 of the mobile device 12 and/or the control module 182. The alert signal may be the same alert signal received at operation 208 of FIG. 5. At 322, in response to the transmitted alert signal, the reporting module 138 may receive the alert response data 120 from the control module 30 of the mobile device 12 or the control module 182 of the network device 34.

Each of operations 324, 326, 328 may be performed while the other ones of the operations 324, 326, 328 are performed. One or more of the operations 326 and 328 may not be performed. At 324, the reporting module 138 may generate a second alert signal based on the alert response data 322. This alert signal may include the alert response data 120, which may be displayed on the display 170 and/or indicated via the speaker 172.

At 326, the sharing module 32, the reporting module 138, and/or one or more of the vehicle control modules 112 may direct the vehicle occupant (or driver) to return the vehicle. As an example, the reporting module 138 may instruct the one or more of the vehicle control modules 112 to provide navigation instructions via the display 170 and the speaker 172 to direct the vehicle occupant to drive the vehicle back to one of the fleet offices 26. At 328, the sharing module 32 and/or the reporting module 138 may instruct the one or more of the vehicle control modules 112 to autonomously control operations of the vehicle, such that the vehicle drives back to the one of the fleet offices 26. The method may end at 336 subsequent to operations 324, 326, 328.

Operations 330, 332, 334 may be performed while or as an alternative to one or more of operations 324, 326, 328. At 330, the sharing module 32 and/or the reporting module 138 may signal the vehicle control modules 112 to prevent and/or limit certain vehicle operations until smoking within the vehicle has stopped. For example, vehicle speed, entertainment system operation, vehicle movement, and/or other aspects may be limited and/or prevented until smoking within the vehicle has stopped.

At 332, the sharing module 32 and/or the reporting module 138 may receive and analyze sensor data. At 334, based on the sensor data, the sharing module 32 and/or the reporting module 138 determines whether smoking has stopped. If smoking has stopped, full operations of the vehicle are resumed and the method may end at 336, otherwise operation 330 may be performed.

FIG. 7 shows a method of operating the network device 34 of the service provider office 22. The method may begin at 400. At 401, the control module 182 of the network device 34 may receive the reservation and/or access request message from the control module 30 of the mobile device 12. This may be the reservation and/or access request message generated at 202 of FIG. 5. At 402, the control module 182 schedules a reservation of a vehicle based on the received reservation and/or access request message. This includes reserving the vehicle for certain dates and/or periods of time for a customer associated with the mobile device 12.

At 404, the control module 182 transmits the access information to the control module 30. At 406, the control module 182 may receive an alert signal from the control module 30 or the reporting module 138 indicating that a smoking event has occurred.

Operations 408, 410 may be performed while operations 412, 414, 416, 418 and 420 are performed. At 408, the control module 182 generates the alert response data 120 based on the received alert signal. At 410, the control module 182 transmits the alert response data 120 to the control module 30 and/or the reporting module 138. The control module 182 makes the customer that reserved the vehicle in which a smoking event has occurred accountable by warning the customer not to smoke, by charging the customer additional fees for having the vehicle cleaned and/or by preventing the customer from reserving vehicles in the future. The control module 182 may cross-reference vehicle log data, sensor data and/or other related data based on corresponding timestamps, vehicle identifiers, customer identifiers, etc. As an example, the customer may be warned a predetermined number of times, and then the customer may be prevented from reserving vehicles in the future. As another example, rates for future car sharing and/or ride sharing services may be adjusted based on a number of smoking events associated with the customer.

At 412, the control module 182 may remove the corresponding vehicle from service. This may include instructing the sharing module 32 to return the vehicle and temporarily preventing car sharing and/or ride sharing use of the vehicle until the vehicle is cleaned.

At 414, the control module 182 schedules cleaning of the vehicle. This may include contacting one of the network devices 38 of the fleet offices 26 and/or one of the network devices 40 of the maintenance offices 28 to have the vehicle cleaned. In one embodiment, the control module 182 instructs one of the network devices 38 that the vehicle needs to be cleaned due to a smoking event. The one of the network devices 38 then schedules the cleaning of the vehicle and may report back to the network device 34 when the vehicle is to be cleaned and/or when the vehicle comes back from cleaning and is available for customer service.

At 416, the control module 182 may schedule one or more alternative vehicles for previously scheduled reservations of the vehicle removed from service. At 418, the control module 182 may receive and/or generate a report that the vehicle is cleaned. At 420, the control module 182 returns the cleaned vehicle back to car sharing and/or ride sharing service and schedules customer reservations of the vehicle. The method may end at 422 subsequent to operations 410 and 420.

Figure 8:
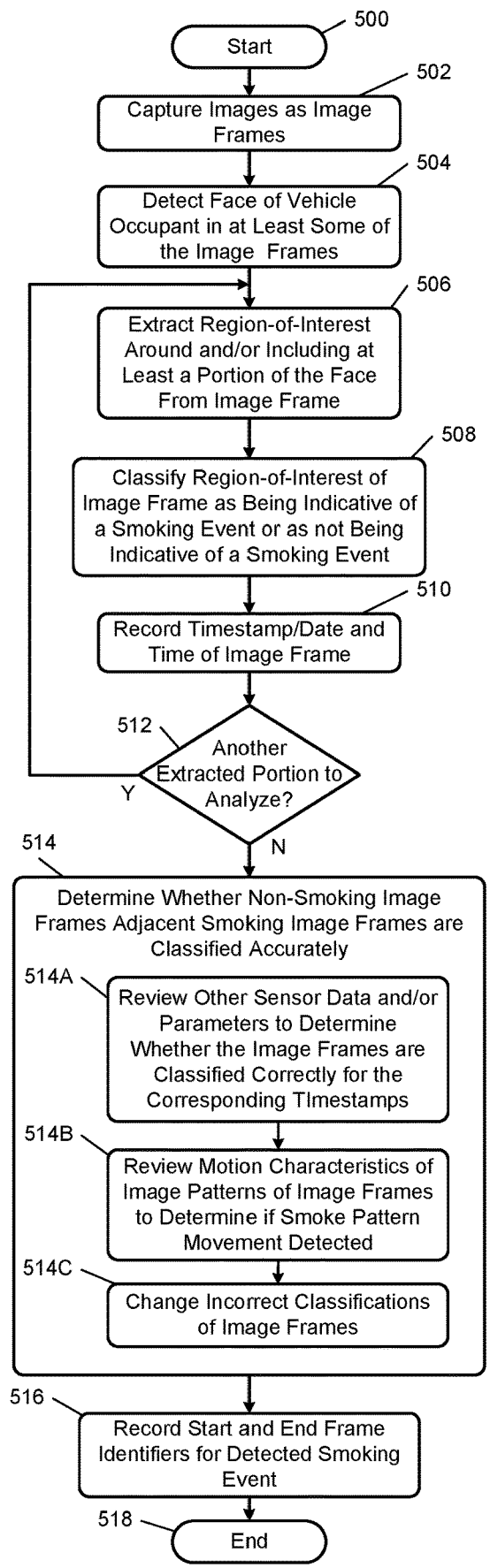
FIG. 8 illustrates an example method of detecting and recording a smoking event in accordance with an embodiment of the present disclosure.

FIG. 8 shows a method of detecting and recording a smoking event. This is one example method, other methods are disclosed herein. The method may begin at 500. At 502, the sensors 130 of the smoke detector 101 may capture images (or video) of areas within a vehicle as image frames. At 504, the detection module 136 analyzes the image frames and detects a face of a person in at least some of the image frames.

At 506, detection module 136 may extract a portion of one of the image frames having the face to provide an image. The extracted portion (or image) may include a portion of the face. For example, a portion of the image including an area around and including a nose and/or mouth of the face may be extracted. At 508, the classification module 137 may analyze the extracted portion to determine whether there is smoke in the extracted portion. As an example, the classification module 137 may include a neural network that is trained to detect smoke based on previous analyzed images known to have smoke and other previously analyzed images known not to have smoke. These images and/or corresponding smoking patterns and non-smoking patterns may be stored in the memory 124. As another example, the classification module 137 may implement a decision tree and/or operate as a support vector machine to classify the extracted portion or region-of-interest. When an extracted portion, region-of-interest and/or image frame is determined to have smoke in the image, the extracted portion, region-of-interest and/or image frame may be tagged and/or a corresponding smoke indication bit may be stored. For example, a bit may be set to '1' when the image has smoke and to '0' when the image does not have smoke. The bit may be stored with the image, extracted portion, region-of-interest, and/or image frame.

At 510, the detection module 136 records the timestamp including the date and time of the image frame. This may be the date and time that the image frame was captured. Operation 510 may be performed when the image frame is captured, in other words, during operation 502. At 512, the detection module 136 determines whether there is another extracted portion of an image frame to analyze. If there is another extracted portion to analyze, operation 506 is performed, otherwise operation 514 may be performed.

At 514, the detection module 136 and/or the classification module 137 may perform operations to verify whether the extracted portions, regions-of-interest and/or image frames classified as images having smoke (e.g., a smoke indicator bit or tag set to '1') and images not having smoke (e.g., a smoke indicator bit or tag set to '0') are accurate. An error may occur in classifying an image, such that there is a gap, for example, between consecutive images that are identified as having smoke. An image may incorrectly be classified as a non-smoking image and have a previous image and a subsequent image that are smoking images. To minimize and/or eliminate errors, operations 514A-514C may be performed.

At 514A, the detection module 136 and/or the classification module 137 may review other sensor data and/or parameters to determine whether the images are classified correctly. The sensor data collected for the same timestamps as the images may be analyzed to determine whether the other sensor data and/or parameters indicate a smoking event or a non-smoking event. Other example techniques for detecting smoke and/or likelihood that a smoking event has occurred are described above, such as use of a scent sensor, monitoring occupant movement, position of a window, driving patterns, etc.

At 514B, the detection module 136 and/or the classification module 137 may review differences between adjacent images to detect motion characteristics of image patterns. Movement of smoke has known patterns. If differences between the images match a movement pattern of smoke, then the images may be identified as being smoking images.

At 514C, the detection module 136 and/or the classification module 137 may change the tag or smoke indication bit for the images that were incorrectly identified as smoking or non-smoking images based on the analysis performed during operations 514A and/or 514B.

At 516, the detection module 136 and/or the classification module 137 may record identifiers of a start image frame and an end image frame for the detected smoking event associated with the images in which smoke is shown. This information may be stored in the memory 124 and provided to the control module 30 of the mobile device and/or the network device 34 of the service provider office 22, for example during operation 320 of FIG. 6. In one embodiment, if the images are determined to be non-smoking images, then the corresponding image frames (or video) may be removed from the memory 124. The method may end at 518.

The above-described operations of FIGS. 5-8 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" refers to, is part of, or includes: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A smoke detection system for an interior of a vehicle, the smoke detection system comprising:
    a memory configured to store at least one of smoke characteristic data and smoke pattern data;
    a detection module configured to, while the vehicle is being used as part of a car sharing or ride sharing service,
        receive a sensor signal from a smoke detector,
        compare data included in the sensor signal to the at least one of the smoke characteristic data and the smoke pattern data,
        based on the comparison, determine whether an occupant of the vehicle is smoking, and
        generate an alert signal if the occupant is smoking, wherein the alert signal indicates that a smoking event has occurred; and
    a reporting module configured to transmit the alert signal to a mobile device of the occupant to indicate to the occupant that the smoking event has been detected, wherein the vehicle is reserved by a service provider for the occupant as part of the car sharing or ride sharing service.

2. The smoke detection system of claim 1, further comprising the smoke detector, wherein:
    the smoke detector includes a camera;
    the camera is configured to view the interior of the vehicle and generate the sensor signal, wherein the data included in the sensor signal includes image data; and
    the detection module is configured to
        compare the image data to the at least one of the smoke characteristic data and the smoke pattern data, and
        based on the comparison between the image data and the at least one of the smoke characteristic data and the smoke pattern data, determine whether the occupant of the vehicle is smoking.

3. The smoke detection system of claim 2, wherein the detection module is configured to:
    via the camera, monitor air within the interior of the vehicle;
    detect at least one of an image pattern or an air movement pattern that matches a smoke pattern stored in the memory, wherein the at least one of the smoke characteristic data and the smoke pattern data includes the smoke pattern; and
    generate the alert signal based on the matching of the smoke pattern.

4. The smoke detection system of claim 2, wherein the detection module is configured to:
    via the camera, monitor movement of the occupant in the interior of the vehicle;
    detect a movement pattern of the occupant that matches a movement pattern stored in the memory, wherein the at least one of the smoke characteristic data and the smoke pattern data includes the movement pattern; and
    generate the alert signal based on the matching of the movement pattern.

5. The smoke detection system of claim 2, wherein the detection module is configured to:
    via the camera, capture images of the occupant in the interior of the vehicle;
    compare at least one of portions or characteristics of the captured images to the at least one of the smoke characteristic data and the smoke pattern data; and
    generate the alert signal based on the comparisons between the at least one of portions or characteristics of the captured images and the at least one of the smoke characteristic data and the smoke pattern data.

6. The smoke detection system of claim 5, wherein the detection module is configured to:
    classify the portions of the captured images as being images with smoke or images without smoke; and
    verify classifications of the portions of the captured images based on sensor data from one or more sensors other than the camera.

7. The smoke detection system of claim 1, wherein the detection module is configured to:
    via a camera, capture images within the interior of the vehicle;
    compare the captured images to images stored in the memory;
    based on the comparisons between the captured images and the images stored in the memory, detect a smoked object; and
    generate the alert signal based on the detection of the smoked object.

8. The smoke detection system of claim 1, further comprising the smoke detector and a classification module, wherein:
    the smoke detector includes a scent sensor;
    the scent sensor is configured to generate the sensor signal;
    the classification module is configured to perform pattern recognition of odors associated with smoking based on the sensor signal; and
    the detection module is configured to generate the alert signal based on results of the pattern recognition.

9. The smoke detection system of claim 1, wherein:
the reporting module is configured to receive alert response data from the mobile device or a network device of the service provider; and
the alert response data includes at least one of an indication to return the vehicle to the service provider or a fleet office, a command for the vehicle to direct the occupant to return the vehicle to the service provider or the fleet office, or a command for the vehicle to autonomously return the vehicle to the service provider or the fleet office.

10. The smoke detection system of claim 1, wherein the reporting module is configured to transmit log data corresponding to the smoking event to at least one of the mobile device or a network device of the service provider.

11. The smoke detection system of claim 1, wherein the detection module is configured to, based on detection of the smoking event, instruct a vehicle control module to prevent or limit operations of the vehicle until smoking by the occupant within the vehicle has stopped.

12. A smoke detection system for an interior of a vehicle, the smoke detection system comprising:
a memory configured to store at least one of smoke characteristic data and smoke pattern data;
a detection module configured to, while the vehicle is being used as part of a car sharing or ride sharing service,
receive a sensor signal from a smoke detector,
compare data included in the sensor signal to the at least one of the smoke characteristic data and the smoke pattern data,
based on the comparison, determine whether an occupant of the vehicle is smoking, and
generate an alert signal if the occupant is smoking, wherein the alert signal indicates that a smoking event has occurred;
a reporting module configured to at least one of (i) based on the alert signal, visually or audibly provide a warning to the occupant to stop smoking, or (ii) transmit the alert signal to a mobile device of the occupant to indicate to the occupant that the smoking event has been detected, wherein the vehicle is reserved by a service provider for the occupant as part of the car sharing or ride sharing service; and
a vehicle control module configured to determine a position of a window of the vehicle,
wherein the detection module is configured to, based on the position of the window, determine whether the occupant is smoking.

13. A network device for a service provider providing car sharing or ride sharing services, the network device comprising:
a control module configured to schedule a reservation of a vehicle for a customer;
a transceiver configured to receive an alert signal and report from at least one of the vehicle or a mobile device of the customer, wherein the alert signal indicates that a smoking event has occurred in the vehicle, and wherein the report includes data corresponding to the smoking event; and
a memory configured to store the alert signal and the report,
wherein the control module is configured to
remove the vehicle from service,
initiate scheduling of cleaning of the vehicle,
schedule an alternative vehicle for a future reservation for the vehicle,
generate alert response data, wherein the alert response data includes at least one of (i) an indication to return the vehicle to the service provider or a fleet office, (ii) a command for the vehicle to direct the customer to return the vehicle to the service provider or the fleet office, or (iii) a command for the vehicle to autonomously return the vehicle to the service provider or the fleet office, and
transmit the alert response data to at least one of the vehicle or the mobile device.

14. The network device of claim 13, wherein the control module is configured to generate the alert response data to include the indication to return the vehicle to the service provider or the fleet office.

15. The network device of claim 13, wherein the control module is configured to generate the alert response data to include a fee for having the vehicle cleaned.

16. The network device of claim 13, wherein the control module is configured to generate the alert response data to include the command for the vehicle to direct the customer to return the vehicle to the service provider or the fleet office or the command for the vehicle to autonomously return the vehicle to the service provider or the fleet office.

17. A mobile device comprising:
a display;
a first transceiver configured to receive at the mobile device a first alert signal from a sharing module of a vehicle while the vehicle is being used as part of a car sharing or ride sharing service, wherein the first alert signal indicates that a smoking event has been detected within the vehicle;
a control module configured to, based on the first alert signal, generate a warning signal and display the warning signal on the display to warn at least one of an owner of the mobile device to have smoking in the vehicle stopped, wherein the control module is configured to generate a second alert signal, wherein the second alert signal indicates that the smoking event has been detected; and
a second transceiver configured to transmit the second alert signal from the mobile device to a network device at a service provider office to report the smoking event, wherein the vehicle is reserved by the service provider for the owner of the mobile device as part of the car sharing or ride sharing service.

18. The mobile device of claim 17, wherein:
the control module is configured to generate a reservation or access request message; and
the second transceiver is configured to
transmit the reservation or access request message to the sharing module, and
based on the reservation or access request message, receive access information from the sharing module to unlock doors of the vehicle and start the vehicle.

19. The mobile device of claim 17, wherein the control module is configured to receive vehicle log data corresponding to the smoking event from the sharing module via the first transceiver and forward the vehicle log data to the network device via the second transceiver.

20. The mobile device of claim 17, wherein:
the second transceiver is configured to receive, based on the second alert signal, receive alert response data from the network device; and
the control module is configured to at least one of display the alert response data or forward the alert response data via the first transceiver to the sharing module of the vehicle.

* * * * *